July 7, 1959  C. H. O. BERG  2,894,041
PROCESS AND APPARATUS FOR HIGH TEMPERATURE REACTIONS
Filed Oct. 14, 1954

INVENTOR.
CLYDE H. O. BERG,
BY
AGENT OR ATTORNEY.

United States Patent Office 2,894,041
Patented July 7, 1959

2,894,041
PROCESS AND APPARATUS FOR HIGH TEMPERATURE REACTIONS

Clyde H. O. Berg, Long Beach, Calif., assignor to Union Oil Company of California, Los Angeles, Calif., a corporation of California Application October 14, 1954, Serial No. 462,343

18 Claims. (Cl. 260—644)

This invention relates to an improved process and apparatus for short contact time reactions effected at elevated temperatures, and particularly relates to those high temperature reactions of an exothermic nature in which close control of the reaction time and heat liberation is required. This invention is especially well adapted to effecting such exothermic reactions as hydrocarbon oxidation, hydrocarbon nitration such as for example the nitration of alkane or paraffin hydrocarbons to produce nitroparaffins, and others. Nitromethane as well as the higher nitroparaffins such as nitroethane, nitropropane, the nitrobutanes, etc. may be produced in this manner.

Up to the present time the preparation of nitromethane has involved the fractionation of the effluent from processes in which higher molecular weight normally gaseous hydrocarbons such as propane and butane were nitrated because there has been developed no commercially practical process for methane nitration. One of the more successful recent attempts at direct methane nitration involved the passage of a mixture of nitric acid and a large excess of methane in the vapor phase and at an average of 100 p.s.i.g. (pounds per square inch gauge) through a tube 3 millimeters in diameter and 180 feet long immersed in a salt bath at a temperature of 410° C. to 430° C. The reaction time was controlled at 1.0 second and the nitromethane yields amounted to approximately 20% based on the nitric acid fed to the system. The exceedingly small diameter and great length of the reaction tube is required to supply sufficient heat transfer area per unit reaction space volume to maintain approximately isothermal conditions during the reaction. The required short contact time of 0.1 to 1.0 seconds necessarily requires an exceedingly high gas velocity and therefore an unduly high differential pressure across the reactor.

Accordingly, the above described nitration process cannot be considered commercially practicable because of the low yields, the minute diameter and extreme length of the individual reaction tubes, the mechanical complexity of an apparatus capable of handling commercial quantities of reactants, the exceedingly high differential pressure inherent in the use of very small and exceedingly long reaction tubes, and the many well-known problems involved maintaining molten salt baths.

Another problem which has heretofore been encountered in nitroparaffin production invloves the fractionation of the reaction zone effluent to recover the excess unreacted hydrocarbon, to separate and reject undesirable products of the reaction such as nitrogen and carbon monoxide and carbon dioxide etc., and to recover the desired nitroparaffin product in pure form. Conventionally the gaseous effluent is cooled and condensed and then the condensate is fractionally distilled to recover the individual nitroparaffins.

The present invention is directed to a substantially improved and commercially practicable integrated process and apparatus for conducting such exothermic high temperature short contact time reactions mentioned above. The present invention does not require the extremely long and small diameter reaction tubes, and the available heat transfer area per unit reaction space volume has been increased of the order of 13 times or more without change in the reaction time. The present invention is also characterized by its relatively small pressure drop and relatively low reactant gas velocity in the reactor whereby materially increased yields of nitromethane and the like are obtained. The present invention is also directed to a process and apparatus in which a selective adsorption system is provided to effect a simultaneous fractionation of the reaction zone effluent and the raw reactant hydrocarbon feed.

It is thus a primary object of the invention to provide an improved process for conducting high temperature exothermic reactions under controlled short contact times.

It is a further object of the invention to effect high temperature exothermic reactions within a reaction zone filled with a mass of relatively uniform size solid particles of relatively high specific heat and thermal conductivity, and then to quench the effluent gases in a quenching zone containing such granular solids at a relatively low temperature.

It is another object of this invention to provide a process in which recirculated solid particles are passed continuously through a reaction zone in which a high temperature exothermic reaction, such as methane nitration, is effected and in which a nitrating agent and a gaseous hydrocarbon react during concurrent passage through a mass of such granular solids and then are quenched by countercurrent contact with a cool bed of solids adjacent and surrounding the reaction zone.

It is a further object of the invention to provide an integrated process for high temperature alkane hydrocarbon nitration and the simultaneous fractionation of the reaction zone effluent and the feed gas hydrocarbons in which a moving bed of solid granular adsorbent contacts these gas streams to produce a substantially pure hydrocarbon feed stream from the reaction zone effluent and a raw hydrocarbon gas, and to produce simultaneously reject streams of carbon monoxide, nitrogen, and carbon dioxide from the process.

It is also an object of this invention to provide an improved apparatus for effecting the foregoing objects.

Other objects and advantages of the present invention will become apparent to those skilled in the art as the description thereof proceeds.

Briefly, the present invention comprises an integrated process for conducting high temperature exothermic reactions at short contact or reaction times and fractionating the effluent simultaneously with a source of reactant gas to prepare and recycle fresh and unreacted reactants within the process. For example, in the nitration of low molecular weight normally gaseous paraffin hydrocarbons such as those having up to about 4 carbon atoms per molecule, nitric acid and a relatively large excess of hydrocarbon gas are reacted in the vapor phase as hereinafter more fully described to produce an effluent containing nitromethane, unreacted methane, carbon monoxide, some nitrogen, carbon dioxide, nitric oxide (NO), formaldehyde, and substantially no unreacted nitric acid. This effluent is cooled and condensed to produce a condensate consisting essentially of nitromethane and water. The uncondensed portion is contacted with water in a primary absorption zone to remove formaldehyde. The unabsorbed gas is then mixed with oxygen to oxidize the nitric oxide to nitrogen dioxide $(2NO_2 \rightleftarrows N_2O_4)$. This gas is then passed through a secondary absorber in the presence of excess oxygen and in which the nitrogen dioxide is dissolved in a countercurrent flow of water to produce a concentrated nitric acid which is recirculated in the process as the nitrating agent.

The residual unabsorbed gas consists of carbon monoxide, nitrogen, carbon dioxide, unreacted methane, and some water and is sent at least in part to a selective adsorption column for recovery and recirculation of the unreacted methane and rejection of the carbon monoxide, nitrogen, and carbon dioxide.

This residual unabsorbed gas from the secondary absorber is introduced into the selective adsorption column simultaneously with and at a point above that at which natural gas is introduced. The unadsorbed gas removed from a high point in a selective adsorption column contains the carbon monoxide and nitrogen to be rejected. A side-cut or intermediate product consisting essentially of methane is removed at a point between the two points of feed gas introduction, and is recirculated to the reaction zone as hydrocarbon feed gas. The most readily adsorbed gas desorbed from the moving bed of adsorbent consists essentially of carbon dioxide, ethane, and higher molecular weight hydrocarbons from the natural gas feed stream, and it is removed from a low point in the selective adsorption column.

The reaction and quenching system consists of an elevated solids receiving and fluid disengaging zone, a primary and a secondary solids cooling zone in solids receiving relation therewith, a reaction zone receiving a primary solids stream from said primary solids cooling zone, a quenching zone surrounding said reaction zone and communicating therewith at its outlet opening and connected to receive a secondary solids stream from said secondary solids cooling zone, a pressuring solids feeder system adapted to receiving and raise the pressure of fluids present in the mixed stream of solids from the bottom of said quenching zone to a pressure substantially greater than that maintained in these zones, and a solids conveyance and cooling zone through which the mixed solids stream moves upwardly as a continuous dense mass concurrently with a process fluid stream whereby the solids are partially cooled and the fluid is partially preheated. The partially cooled solids are discharged into the solids receiving zone to complete the solids cycle.

The primary solids stream, partially cooled in the conveyance, is further cooled by heat exchange in the primary solids cooling zone to a temperature slightly below the reaction temperature desired in the reaction zone. In the process of this invention this solids cooling step is conveniently effected by steam generation. The cool primary solids stream is then passed downwardly by gravity as a dense mass or bed through the reaction zone at a relatively high rate concurrently with the reacting fluids which flow through the solids' interstices. The liberated heat of reaction is rapidly absorbed in the granular solids so as to maintain substantially isothermal reaction conditions.

The secondary solids stream flows downwardly as a moving bed through a secondary cooling zone and is cooled therein to a temperature sufficiently below that of the reaction zone so as to quench the effluent therefrom in the surrounding quenching zone. The primary and secondary solids streams are combined below the lower opening of the reaction zone and are handled as previously described. The reactants flow concurrently through the interstices of the primary solids stream in the reaction zone, downwardly through its outlet opening, then flow laterally a short distance into the cool secondary solids stream, and then upwardly through the interstices of the cold solids in the quenching zone. Due to the extended surface area, the high specific heat, and the high thermal conductivity of the granular solids, the temperature of the reaction zone effluent is rapidly decreased thereby stopping the reaction and forming a cool effluent gas which is at a temperature above its dew point. The quench effluent gas is removed from the top of the quenching zone and fractionated as described below.

In methane nitration for example, a reaction time of 1.0 second duration is obtained using granular solids 3 millimeters in diameter flowing through a reaction zone 3.2 inches in diameter and 48 inches long when the reactant gas mixture is introduced at a rate of 0.6 cubic foot per second. The fluid velocity is only 13.5 feet per second through the solids interstices, and the pressure differential is roughly one-seventh that required in the tubular reactor discussed above, which was 3 millimeters inside diameter and 180 feet long. It should be noted that the salt baths have been eliminated and that the cross-sectional area of the granular solids in the reaction zone of this invention is 87.7 square feet compared to 6.57 square feet in the tubular reactor.

These novel features have permitted substantial increases in nitromethane yields which have been obtained as high as 33% based on the nitric acid reacted.

The quenched reaction zone effluent and raw hydrocarbon feed gas fractionation system of this invention involves the recirculation of a moving bed of solid granular adsorbent downwardly by gravity in a selective adsorption column through a succession of adsorption, rectification, and stripping zones. The uncondensed portion of the quenched effluent is introduced into the upper portion of the selective adsorption zone at pressures between about 100 and 400 p.s.i. (pounds per square inch) so as to adsorb methane, carbon dioxide, and any more readily adsorbable constituents including water vapor and leaving carbon monoxide and nitrogen and less readily adsorbable constituents substantially unadsorbed. These latter constituents are removed as an unadsorbed lean gas to prevent them from building up in the process. The rich adsorbent containing the adsorbed materials is first rectified with a first reflux gas containing methane to preferentially desorb traces of carbon monoxide, nitrogen, and less readily adsorbable gases which join the unadsorbed lean gas. This partially rectified adsorbent is then further rectified by countercurrent contact with a more readily adsorbable gas containing carbon dioxide, ethane, and more readily adsorbable constituents thereby raising its temperature and preferentially desorbing the adsorbed methane as the first reflux and as an intermediate or side-cut gas product. Part of the methane so produced is derived from the unadsorbed portion of natural gas injected as a secondary feed gas at a point below that at which the side-cut gas product is removed, and the rest is unreacted methane adsorbed from part of the unabsorbed gas removed from the nitric acid absorber.

In the case of the secondary or natural gas feed, the ethane and higher molecular weight hydrocarbons are preferentially adsorbed leaving methane substantially unadsorbed to rise countercurrent to the adsorbent and be removed as the side-cut gas product. The rich rectified adsorbent remaining is contacted with stripping steam in a desorption zone to desorb the rich gas constituents which are in part employed as reflux to desorb the methane and are ultimately removed as rich gas product from the system. The hot lean granular adsorbent is subsequently cooled and returned for repassage downwardly through the adsorption and rectification zones described.

The side-cut gas product is combined with that portion, if any, of the uncondensed quenched reaction zone effluent which is not passed through the adsorption system and the mixture is recycled directly to the reaction zone. Only a sufficient portion of this quenched reaction zone effluent is treated in the selective adsorption zone to maintain the carbon dioxide, carbon monoxide, and nitrogen concentrations in the feed gas to the reaction zone at values less than about 25%.

The process and apparatus of the present invention will be more clearly understood by reference to the accompanying drawing which shows a schematic flow diagram of the process together with detailed elevation views in partial cross section of the reactor and the selective adsorption column.

Figure 1:
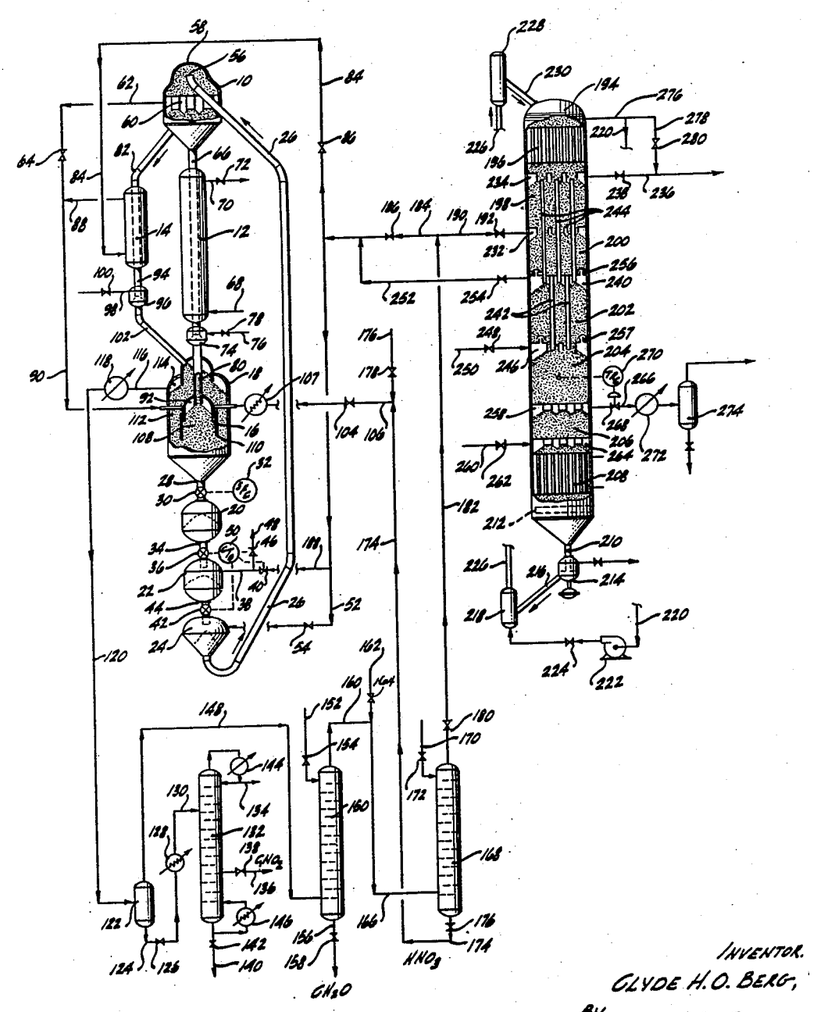

Referring now more particularly to the drawing, which will be described as a practical example of the invention applied to methane nitration but which is also applicable to nitration of hydrocarbons of 2, 3, and 4 carbon atoms per molecule, the reactor apparatus includes solids receiving and fluid disengaging chamber 10, primary cooling chamber 12, secondary cooling chamber 14, reaction chamber 16 surrounded by quenching chamber 18, upper solids surge chamber 20, solids pressuring chamber 22, and lower solids surge and induction chamber 24. Solids conveyance and cooling conduit 26 communicates the bottom of induction chamber 24 with the top of solids receiving chamber 10 and completes the solids circulating cycle.

A mixed stream of the solid contact material comprising the primary and secondary solids streams referred to below is removed at a pressure of 100 p.s.i.g. and a temperature of about 885° F. from the bottom of quenching chamber 14 through line 28 at a rate of 80 tons per hour controlled by valve 30 in response to solids flow controller 32. The solids are discharged as a continuous stream into upper solids surge chamber 20 from which they are intermittently removed through line 34 controlled by automatically operated valve 36 and discharged into solids pressuring chamber 22. Valve 32 is then closed and methane is introduced through line 38 controlled by valve 40 to raise the pressure of vessel 22 to about 135 p.s.i.g., the increase of 35 p.s.i. being substantially equal to the pressure differential existing between the inlet and outlet of solids conveyance and cooling conduit 26. Outlet valve 42 is then opened and the pressured solids are transferred through line 46 by gravity into induction chamber 24. Valve 42 is then closed, valve 46 is then opened, and pressuring chamber 22 is depressured by venting gases through lines 38 and 48 sufficiently to reduce the pressure in vessel 22 to about 100 p.s.i.g. Valve 36 is then reopened to admit additional solids for pressuring and the sequence is repeated as described controlled by cycle timer operator 50 which controls the operations of valves 36, 42, 40, and 46.

The mixed stream of granular solids is passed from induction chamber 24 by gravity into and then upwardly through conveyance and cooling conduit 26 as a dense upwardly moving mass having a bulk density substantially equal to the static bulk density when at rest. In the case of alumina or silica, this density is about 65 pounds per cubic foot. The mass of solids in line 26 is moved upwardly concurrently with a flow of methane to be preheated and which flows through line 52 at a rate of about 7,500 s.c.f. per hour controlled by valve 54. This rate is sufficient to establish the pressure gradient $$\frac{dp}{dl}$$

in pounds per square foot per foot which exceeds the value defined by the following equation:

$$\frac{\frac{dp}{dl}}{\rho_s \cos \theta}$$

wherein $\rho_s$ is the static bulk density of the solids in pounds per cubic foot and $\theta$ is the angular deviation of the conveyance direction from a vertical upward reference axis. Under these conditions the pressure gradient generated is sufficient to overcome forces of gravity and friction acting on the solids in conduit 26 and will permit upward movement thereof as a dense packed mass through the conduit so long as solids are supplied at the inlet and removed at the outlet of conveyance conduit 26.

The granular solids during conveyance are maintained in dense mass form and are prevented from fluidization or suspension in the concurrent gas flow by applying a thrust force or solids flow restriction against the mass of solids discharging from outlet opening 56 of conduit 26. This is achieved in the present case by discharging the solids from outlet 56 upwardly at a point between about 0.1 and 2.0 outlet opening diameters below the roof 58 of solids receiving chamber 10. Chamber 10 is kept full of a moving mass of discharged solids. This effectively restricts the discharge of the granular solids from conduit 26 without substantially restricting the flow of the fluid moving concurrently therewith and maintains the moving solids at their static bulk density.

The discharged granular solids mass reverses direction and flows by gravity downwardly as a dense mass through conveyance fluid disengaging zone 60 in which the preheated methane is disengaged from the conveyed solids mass and is removed through line 62 at a rate controlled by valve 64. This gas stream is further treated as subsequently described.

The conveyed granular solids, at a temperature of about 875° F., are divided into a primary stream and a secondary stream at the bottom of solids receiving chamber 10. The primary solids stream flows downwardly by gravity at a rate of 55 tons per hour through primary transfer line 66 and primary solids cooler 12 wherein the solids are cooled to a temperature of about 860° F. in indirect heat exchange relation with evaporating water. Primary cooling zone 12 is thus a steam generation zone into which condensate is introduced through line 68 and from which steam is removed through line 70 controlled by valve 72 at a rate of 500 pounds per hour. This steam is employed in part within the process itself and any excess is disposed of in other uses. The stream of primary solids passes downwardly through primary sealing zone 74 into which a primary seal gas stream is introduced through line 76 at a rate of about 400 pounds per hour controlled by valve 78. The seal gas conventionally comprises a portion of the steam generated as above described. The primary seal gas stream splits into two portions, a first portion passing upwardly countercurrent to the primary solids stream and a second portion passing downwardly concurrently therewith to prevent intermixing of the gases present in the reaction zone 16 and those present in fluid disengaging zone 60. The primary solids stream then passes downwardly as a moving bed or mass by gravity and is introduced directly through transfer line 80 into the upper portion of reaction zone 16.

The secondary solids stream passes downwardly as a moving bed through secondary transfer conduit 82 and secondary cooling zone 14 in which these granular solids are indirectly cooled to a temperature of about 360° F. by indirect heat exchange with a second portion of the methane gas feed introduced through line 84 at a rate of about 390,000 s.c.f. per hour controlled by valve 86. This portion of the methane feed is preheated to a temperature of about 865° F., is removed from zone 14 through line 88, is combined with the primary methane stream flowing through line 62, and the mixed preheated methane stream thus formed passes through line 90 directly into reactant engaging zone 92 at the top of reaction zone 16.

The cooled secondary solids stream continues downwardly through transfer line 94 and secondary sealing zone 96 into which a secondary sealing gas such as steam is introduced through line 98 at a rate of about 100 pounds per hour controlled by valve 100. This secondary seal gas stream also splits into two parts as does the primary sealing gas stream described above and prevents intermixing of the gases in disengaging zone 60 with the effluent gases in the upper portion of quenching zone 18.

Aqueous nitric acid of about 55% concentration is introduced at a rate of 7650 pounds per hour controlled by valve 104 through line 106 and is heated to 500° F. in acid heater 107 and mixed with the preheated methane prior to reaching reactant engaging zone 92. The reactants immediately react in the interstices of the primary solids stream in moving bed 108. The approximate dimensions of the reaction zone are 20 inches in diameter and 20 inches in length. The reaction time is approximately 0.1 second, the reaction temperature is approximately 900° F., and the primary solids stream absorbs the liberated heat of reaction very rapidly and rises to a temperature of about 1000° F.

A coaxial collar 110 is provided at the lower portion of reaction zone 16 which may be moved upwardly or downwardly to decrease or increase the length of the reaction zone so as to permit the variation in the contact or residence time within the reaction zone without requiring a variation in the flow rate of either the reactants, or of the primary or secondary solids streams.

The reaction zone effluent passes downwardly, then radially into contact with the cold secondary solids stream in quenching zone 18, and then passes upwardly countercurernt to the surrounding stream of secondary solids which passes downwardly by gravity as moving bed 112. Herein the reaction effluent is rapidly quenched to a temperature of about 500° F. through the absorption of heat in the cold secondary solids stream. The primary and secondary solids streams combine in quenching chamber 18 at a point below the lower periphery of collar 110 and the mixed solids stream is removed through transfer line 28 and recirculated and cooled as described above.

The quenched reaction zone effluent accumulates in disengaging zone 114, is removed therefrom through line 116, and is cooled and partially condensed in cooler 118. The mixed fluid stream then passes through line 120 into vapor liquid separator 122 wherein the liquid and vapor phases are separated.

The liquid phase, consisting primarily of nitromethane, formaldehyde, and water, is removed from separator 122 through line 124 at a rate of about 400 gallons per hour controlled by valve 126. This liquid phase is passed through preheater 128 and line 130 into fractionation column 132 from which water is removed as an overhead product from line 134, nitromethane is removed as an intermediate product through line 136 at a rate of 100 gallons per hour controlled by valve 138, and a bottoms product containing some higher molecular weight nitroparaffins is removed through line 140 at a rate controlled by valve 142. Reflux condenser 144 and reboiler 146 are provided at the top and bottom respectively of column 132.

The nitromethane product constitutes a 30% yield based on the nitric acid reactant and constitutes a considerable improvement over the 15% to 20% yields obtained heretofore in the tubular recactors discussed above.

The uncondensed portion of the effluent consists predominantly of methane and also contains carbon dioxide, carbon monoxide, water and formaldehyde vapors, and nitric oxide, but substantially no nitric acid. This gas or vapor flows through line 148 and is passed upwardly through primary absorption zone 150 countercurrent to a primary water stream introduced at a rate of 5600 gallons per hour through line 152 controlled by valve 154 and aqueous solution containing 15% formaldehyde is removed from the bottom of the column through line 156 at a rate of 6600 gallons per hour controlled by valve 158. The unabsorbed gas is removed from the top of the column through line 160 and consists essentially of methane, nitrogen, carbon dioxide, a small quantity of water vapor, and nitric oxide.

Oxygen, either pure or as air, is introduced at a rate of 430,000 s.c.f. per hour through line 162 controlled by valve 164 into admixture with the primary unabsorbed gas flowing through line 160. This gas mixture passes through line 166 during which time a rapid oxidation of the nitric oxide to 99% completion occurs forming nitrogen dioxide which is actually the equilibrium mixture of $2NO_2 \rightleftarrows N_2O_4$.

The nitrogen dioxide-containing gas mixture is passed upwardly through secondary absorption column 168 countercurrent to a downwardly flowing secondary stream of water and in the presence of excess oxygen. Herein the nitrogen dioxide is absorbed in and reacts with the secondary water stream to produce nitric acid and the liberated nitric oxide is reoxidized to substantial extinction effecting a substantially complete conversion of nitric oxde to aqueous nitric acid. The secondary water stream is introduced through line 170 at a rate of 300 gallons per hour controlled by valve 172. Nitric acid of 55% concentration is removed from column 168 through line 174 at a rate of 480 gallons per hour controlled by valve 176 and is passed back to reaction zone 16 together with fresh nitric acid of 55% concentration introduced through line 176 at a rate of 170 gallons per hour controlled by valve 178.

The secondary unabsorbed gas removed from the top of secondary absorption column 168 at a rate of 370,000 s.c.f. per hour controlled by valve 180 consists essentially of unreacted methane together with less than about 20% of nitrogen, carbon monoxide, carbon dioxide, and water vapor. This gas stream constitutes the reactant recycle gas and is passed through line 182 and split into two portions. The first portion is passed through line 184 at a rate of about 350,000 s.c.f. per hour controlled by valve 186 and is recycled directly together with fresh methane reactant into the reaction zone described above. Part of the methane reactant is employed as the conveyance fluid and is introduced through line 52, and another part is employed in pressuring solids feeder vessel 22 and is introduced through line 188. The remainder passes through line 84 into the secondary solids cooling zone 14 and is preheated therein.

The second portion of the secondary unabsorbed gas is passed through line 190 at a rate of 20,000 s.c.f. per hour controlled by valve 192 and is introduced into selective adsorption column 194 described immediately below. Herein this portion of the recycle gas is fractionated to remove carbon dioxide, carbon monoxide, and nitrogen, and a concentrated methane stream passes therefrom to the reaction system.

In the selective adsorption column 194 a downwardly moving bed of solid granular adsorbent passes by gravity successively through adsorbent cooling zone 196, first adsorption zone 198, primary rectification zone 200, second adsorption zone 202, secondary rectification zone 204, desorption zone 206, and heating zone 208. The adsorbent is removed at the bottom of column 194 through sealing leg 210 at a rate of adsorbent circulation controlled by adsorbent feeder 213. This adsorbent passes through adsorbent valve 214 which maintains sealing leg 210 full of adsorbent, and then the adsorbent flows through transfer line 216 into induction zone 218. A recirculating lift gas, consisting essentially of the lean gas containing the less readily adsorbable constituents, passes through line 220 under the influence of lift gas blower 222 and at a rate controlled by valve 224 into induction zone 218. Herein the adsorbent is picked up and suspended in the lift gas and conveyed upwardly through conveyance zone 226 in a conventional gas-lift or pneumatic conveyance system. The suspension is discharged into impactless separator zone 228 wherein the lift gas velocity is reduced and the solids separate by gravity therefrom and are returned through upper transfer line 230 into the upper portion of selective adsorption column 194. If desired, the lean adsorbent may be conveyed as a moving mass as described above in relation to the circulation of the solids in the reactor.

The portion of the secondary unabsorbed gas flowing through line 190 at a rate of 20,000 s.c.f. per hour passes into first feed gas engaging zone 232 and then upwardly through first adsorption zone 198 countercurrent to the primary adsorbent stream flowing therethrough. Herein the methane and carbon dioxide content of the first feed gas is preferentially adsorbed leaving nitrogen and carbon monoxide unadsorbed as the least readily adsorbable reject lean gas product. This gas collects in lean gas disengaging zone 234 and is in part removed therefrom through line 236 at a rate controlled by back pressure regulator 238 and discharged from the system.

The primary rich adsorbent containing the adsorbed carbon dioxide and methane passes downwardly through primary rectification zone 200 wherein it is countercurrently contacted with a primary reflux gas consisting of methane passing upwardly from side cut disengaging zone 240. This reflux serves to preferentially desorb traces of adsorbed lean gas forming a primary rectified adsorbent which then flows through primary tubes 242 and is discharged into the upper portion of secondary rectification zone 204. The treatment of this primary stream of adsorbent will be discussed below.

As shown, a plurality of secondary tubes 244 extends from the top of primary adsorption zone 198 into the top of secondary adsorption zone 202. Through these tubes is carried a secondary adsorbent stream which passes downwardly indirectly through the second adsorption zone 202 into the top of secondary rectification zone 204. Herein it mixes with the primary adsorbent stream for passage therethrough. A fresh source of methane reactant, such as natural gas, is introduced to secondary feed engaging zone 246 at a rate of 50,000 s.c.f. per hour controlled by valve 248 through line 250 and passes through risers 257 upwardly countercurrent to the descending secondary adsorbent in secondary adsorption zone 202. Herein the ethane and higher molecular weight hydrocarbon gases are preferentially adsorbed on the downwardly moving adsorbent leaving methane substantially unadsorbed as a side cut or intermediate product. This product progresses upwardly to disengaging zone 240, and is removed therefrom through line 252 at a rate controlled by valve 254. It is mixed with the recycled portion of the secondary absorbed gas flowing through line 184 into the nitration step of the process. As stated before, a portion of this methane passes upwardly through risers 256 as reflux in zone 200.

It should be noted that tubes 242 convey the primary rectified adsorbent containing adsorbed carbon dioxide along with the adsorbed methane downwardly past disengaging zone 242 and secondary adsorption zone 204 and thereby contamination of the side cut gas product with carbon dioxide is prevented. Any carbon dioxide liberated from the mixed adsorbent stream below the lower ends of tubes 242 is substantially readsorbed on the secondary adsorbent stream with the $C_2$ and higher molecular weight hydrocarbon in secondary adsorption zone 202 and is carried downwardly through the column therewith.

The mixed stream of primary rectified adsorbent, saturated with methane and carbon dioxide, and the secondary rich adsorbent, saturated with carbon dioxide and $C_2$ and higher molecular weight hydrocarbons, flows downwardly through secondary rectification zone 204 wherein it is countercurrently contacted with a reflux gas containing carbon dioxide and the hydrocarbons of higher molecular weight than methane. This secondary reflux gas is preferentially adsorbed on the mixed adsorbent and causes a preferential desorption or displacement of the methane which progress upwardly through the column as described and is removed as the side cut gas product. The mixed rectified adsorbent, substantially freed of methane, then passes downwardly from secondary rectification zone 204 through rich gas product disengaging zone 258 and into and through desorption zone 206. Herein the mixed rectified adsorbent is countercurrently contacted with a stripping gas such as steam introduced through line 260 at a rate of 1000 pounds per hour controlled by valve 262 into stripping gas engaging zone 264. Substantially all the adsorbed carbon dioxide and ethane and heavier molecular weight hydrocarbon gases are preferentially desorbed in zone 206, a portion passes upwardly as the secondary reflux gas into secondary rectification zone 204, and the remainder is removed from disengaging zone 258 through line 266 at a rate controlled by valve 268 under the influence of temperature recorder controller 270 in response to the detected temperature of the mixed adsorbent streams being rectified in secondary rectification zone 204. The rich gas is cooled and partially condensed in cooler 272, and the uncondensed rich gas is separated from the condensed stripping steam in separator 274.

The partially stripped adsorbent then passes downwardly through the tubes of heating zone 208 wherein it is indirectly heated to temperatures of between about 300° F. and about 800° F. and is contacted with further quantities of stripping steam which is thermally desorbed from the adsorbent. This treatment desorbs substantially all of the remaining adsorbed rich gas constituents which are recovered as described above. A hot lean adsorbent remains which is removed from the bottom of the column and conveyed to the top thereof as described above. The hot lean adsorbent passes downwardly through lean adsorbent cooler 196 wherein it is indirectly cooled to temperatures of the order of 100° F. or lower and is then passed downwardly through the various zones of selective adsorption column 194 as described. The cooling adsorbent in zone 196 is countercurrently contacted by a purge gas consisting of a portion of the primary lean gas passing upwardly from zone 234 through the tubes in cooler 196 and is removed together with the recirculating lift gas through line 276. A portion of this gas is recirculated through line 220 as the lift gas and a portion equivalent to the purge gas flow is bled from the system through line 278 at a rate controlled by valve 280 and is discharged from the system as by admixture with the lean gas flowing in line 236.

The selective adsorption process just described is one in which primary tubes 242 and secondary tubes 244 are sometimes optional. These tubes and their function are responsible for the complete elimination of carbon dioxide contamination in the side cut gas methane product. Under some conditions of operation, the carbon dioxide content of the reactor effluent is quite low, a sufficient quantity of the carbon dioxide can be produced from the selective adsorption column with the rich gas product removed from disengaging zone 258, and the carbon dioxide content of the side cut methane gas product becomes so low that the more complicated structure shown becomes unnecessary. In such a case a single continuous moving bed of adsorbent passes downwardly successively through zones 198, 200, 202, 204, and 206 and the methane side cut is contaminated by relatively small amounts of carbon dioxide which are in equilibrium with the rectified adsorbent passing downwardly through disengaging zone 240 from primary rectification zone 200.

Either selective adsorption modification may be employed depending upon the extent to which carbon dioxide contamination can be tolerated.

The foregoing description of the drawing provides an illustration of the process of this invention for effecting high temperature exothermic reactions under carefully controlled conditions of residence or contact time and in which the effluent is rapidly quenched, namely the nitration of methane. It should be understood that other reactions requiring short controlled contact times and which are exothermic in nature and which are best effected at relatively high temperatures can also be carried out in the same apparatus under appropriate conditions of pressure, temperature, and composition.

The reaction conditions employed will vary widely depending upon the specific process being carried out. For the nitration of methane, it is preferred that the reaction zone be maintained at a temperature between about 700° F. and 1000° F. and preferably between 800° F. and 890° F., the secondary solids to the quenching zone be at a temperature lower than about 500° F., and preferably between about 100° F. and 400° F., and that the molar ratio of methane to nitric acid be maintained at a value in excess of 5 and preferably at values between about 10 and about 20. The operating pressure is superatmospheric and preferably between values of about 50 p.s.i.g. and about 500 p.s.i.g. The contact time is preferably less than about 5 seconds and preferably between about 0.05 and 0.5 seconds depending upon the operating pressure.

The nitration agent employed is preferably concentrated nitric acid having a concentration of between about 40% and about 70%, but apparently the actual concentration does not appreciably alter the results obtained. If desired, the reactant mixture can be enriched with oxygen to an extent not exceeding 2% by volume to enhance the nitration reaction and to also increase the yield of formaldehyde. Other nitration agents such a fuming nitric acid, or the equilibrium mixture of nitrogen dioxide and dimer ($2NO_2 \rightleftharpoons N_2O_4$) or others may also be used in the nitration process of this invention, but nitric acid has been found to be preferable.

Although the illustrative example is devoted to the nitration of methane, the nitration of the other low molecular weight hydrocarbons may also be readily effected at substantially the same reaction conditions as indicated above and the same advantages discussed previously are realized with these higher molecular feeds. The lower molecular weight paraffins having up to about 4 carbon atoms per molecule may be successfully nitrated according to this invention to form mixtures of nitroparaffins. The nitrogen derivative which predominates in the mixture is that having the same number of carbon atoms per molecule as the feed hydrocarbon because the reaction may be more readily controlled apparently due to the materially increased cross-sectional area through which the exothermic heat of reaction is dissipated and also due to the extremely rapid quench obtainable in this process.

The granular solids which are recirculated in the reaction system of this invention are preferably graded so as to have a substantially uniform particle size, and are selected on the basis of a high thermal conductivity and high specific heat. The granular solids are sized between outside limits of 0.05 inch and about 1.0 inch average diameter, and preferably are between about 0.2 and 0.5 inches in average diameter. It should be noted that the average diameter of the particles selected strongly influences the ratio of the cross-sectional area open to heat transfer (total external area of the solids) to the intersticial volume open for fluid flow within the reaction zone. Accordingly the size may be selected to increase or decrease the cross-sectional area available for heat transfer and absorption of the exothermic heat of reaction.

The granular solids which are applicable in the process of this invention of course vary with the type of reaction being effected and the temperature at which the reaction is carried out.

The granular solid contact material employed in the process of this invention may either be naturally occurring or specially manufactured refractory materials. The solid contact material may be in the form of fragments or granules which have been screened to provide a fairly uniform mesh size range and a preferred form of the contact material comprises semispherical manufactured refractories presently commercially available. A partial list of materials which may be employed include magnesium oxide, zirconium oxide, porcelain, or other ceramics, mullite, granular coke preferably produced by contact coking, metal balls such as those of high melting point metals, stainless steel and other temperature resistant alloys, the various refractory oxides such as those of aluminum, calcium, magnesium, silicon, zirconium and the like, the carbides including those of silicon and tungsten, granular quartz, graphitic materials of the well-known types, treated temperature stable clays, and in general any refractory granular material capable of withstanding the particular extreme temperature employed in a given process to which the principles of the present invention are applied.

All of these materials of course are not satisfactory in paraffin nitration, however and in this specific process it is preferred to employ aluminum oxide, silica, and the like as the granular solid contact material. A selected fraction of these solids ranges in size from about 0.125 inch to about 0.375 inch average diameter.

In the gas fractionation portion of the process of this invention a solid granular adsorbent is employed capable of adsorbing large quantities of gases. A suitable adsorbent is granular activated coconut shell charcoal such as Columbia grade 6G, but other activated charcoals may be employed. Other suitable adsorbents include activated aluminum oxide, silica gel, and the various other inorganic solid adsorbents.

The granular adsorbent is preferably employed in the adsorption column as a moving dense bed and accordingly the size of the adsorbent granules preferably ranges from a minium of about 40 mesh to a maximum of about 0.25 inch average diameter, and a preferred mesh size range is between about 10 and 20 mesh.

The operating pressure of the selective adsorption step is preferably the same as that of the reaction step when such pressures are between about 100 and about 300 p.s.i.g. or higher. Superatmospheric pressures of the order of 300 p.s.i. are of significant assistance in the separation of methane which is adsorbable from the carbon monoxide and nitrogen which have quite low adsorbabilities at the higher pressures.

The quantity of the secondary unabsorbed recycle gas which is fed through the selective adsorption step of this invention is variable and is controlled to a sufficiently high value to maintain the hydrocarbon feed to the reactor at a value of about 80% by volume or over.

As an example of other exothermic processes which are advantageously effected according to the process of this invention, the oxidation of natural gas with air or oxygen to produce ethylene, acetylene, and the like may be cited. The process of the present invention is therefore obviously applicable to vapor phase exothermic reactions in which temperature and residence time control is essential in a system providing an extended cross-sectional area for heat transfer in order to dissipate the heat liberated during reaction.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the vapor phase exothermic nitration of a hydrocarbon with a fluid nitrating agent at controlled reaction times of short duration which comprises withdrawing a stream of warm granular solid contact material from a quenching zone, conveying said solids to an elevated solids receiving zone, passing a primary stream of solids therefrom through a primary cooling zone into a nitration zone and a secondary stream of solids therefrom through a secondary cooling zone into a quenching zone which surrounds and communicates with the outlet of said nitration zone whereby said stream of warm solids is formed by admixture of said primary and secondary streams, cooling said secondary solids stream to a temperature sufficient to quench the nitration product, cooling said primary solids stream to a temperature below the desired nitration temperature, passing a reactant fluid consisting essentially of preheated hydrocarbon and nitrating agent downwardly through said reaction zone forming a product fluid mixture while absorbing liberated heat of reaction at the nitration temperature in said primary solids stream, passing said product fluid therefrom into said quenching zone and upwardly therethrough countercurrent to said secondary solids to quench the fluid and stop the nitration, removing the quenched product fluid containing unreacted reactant and recovering the desired product therefrom.

2. A process as defined in claim 1 wherein said reactant fluid consists of nitric acid plus a paraffin hydrocarbon containing from one to four carbon atoms.

3. A process as defined in claim 1 wherein said reactant fluid consists of nitric acid and methane.

4. A process for the vapor phase exothermic nitration of a hydrocarbon with a fluid nitrating agent at controlled reaction times of short duration which comprises withdrawing a stream of warm granular solids contact material from a quenching zone, conveying said solids to an elevated solids receiving zone, passing a primary stream of solids therefrom through a primary cooling zone into a reaction zone, and a secondary stream of solids therefrom through a secondary cooling zone into a quenching zone which surrounds and communicates with the outlet of said reaction zone whereby said stream of warm solids is formed by admixture of said primary and secondary streams, cooling said secondary solids stream in said secondary cooling zone to a temperature sufficient to quench the nitration reaction product, cooling said primary solids stream in said primary cooling zone to a temperature below the desired nitration temperature, passing a preheated mixture of hydrocarbon and said nitrating agent downwardly through said reaction zone forming a fluid product mixture while absorbing the liberated heat of reaction at the reaction temperature in said primary solids stream, passing said product fluid therefrom into said quenching zone and upwardly therethrough countercurrently to said secondary solids stream to quench the fluid and stop the reaction, removing the quenched product fluid containing unreacted hydrocarbon and undesired by-products of nitration, separating said unreacted hydrocarbon from the desired nitration product by steps including cooling and condensing said quenched product fluid, leaving an uncondensed gas mixture, recirculating part of said gas mixture directly to said reaction zone for further treatment, contacting the remaining part of said gas mixture with a moving bed of solid granular adsorbent to adsorb the unreacted hydrocarbon reactant, thereby forming a rich adsorbent and leaving by-product nitration gases unadsorbed, desorbing said unreacted hydrocarbon from said adsorbent in a form substantially free of said by-product gases, and returning the thus desorbed hydrocarbon to said reaction zone.

5. A process according to claim 4 in combination with the step of passing a reactant in direct heat exchange relation to said secondary solids stream in said secondary cooling zone to form cool solids for said quenching zone and a preheated reactant for introduction into said reaction zone.

6. A process according to claim 4 wherein solids conveyance from said quenching zone to said elevated solids receiving zone comprises the steps of passing the mixed solids into a solids pressuring zone, injecting a fluid to raise the pressure in the interstices of the solids therein to a value above that of said reaction and quenching zones, passing the solids into and through an elongated solids conveyance and cooling zone by flowing concurrently therethrough into said solids receiving zone a reactant fluid at a rate sufficient to overcome forces of gravity and friction acting on said solids, and applying a flow restriction against the mass of solids discharging from said conveyance zone without substantially restricting the discharge of said fluid to maintain said solids during conveyance as an upwardly moving mass having substantially the static bulk density of said solids when at rest.

7. A process according to claim 4 in combination with the step of contacting said adsorbent with a hydrocarbon mixture as a secondary feed containing further quantities of said hydrocarbon as a less readily adsorbable component whereby this unadsorbed component is mixed with said unreacted hydrocarbon reactant desorbed from said rich adsorbent in an amount equivalent to the hydrocarbon reactant consumed in said reaction zone.

8. A process for the production of nitromethane by methane nitration with nitric acid which comprises passing a gaseous mixture of nitric acid and excess methane concurrently with a hot primary solids stream as a moving bed through a reaction zone to form a hot product gas, quenching said product gas by flowing said gas upwardly countercurrent to a cool secondary solids stream in a quenching zone which surrounds and communicates with the lower outlet opening of said reaction zone, removing the warm combined solids stream from below said reaction and quenching zones, conveying the warm solids to an elevated solids receiving zone, passing said primary solids stream downwardly through a primary cooling zone to cool said solids to a temperature below the reaction temperature and then into said reaction zone, passing said secondary solids stream downwardly through a secondary cooling zone to cool said solids to a quench temperature substantially below said reaction temperature and then into said quenching zone, cooling and partially condensing the quenched product gas, fractionating the condensate to separate nitroparaffins including nitromethane therefrom, contacting the noncondensed phase with a primary adsorbent to remove formaldehyde therefrom leaving a primary unadsorbed gas containing nitric oxide, mixing said gas with excess oxygen to oxidize the nitric oxide to nitrogen dioxide, contacting the oxidized gas with a secondary water adsorbent forming nitric acid leaving a secondary unabsorbed gas containing unreacted methane together with carbon monoxide, nitrogen, and carbon dioxide, recirculating said nitric acid with fresh acid to said reaction zone, recirculating one part of said secondary unabsorbed gas to said reaction zone for further reaction, passing the remainder of said gas into a selective adsorption zone wherein said methane and carbon dioxide are adsorbed on a moving bed of solid granular adsorbent leaving said carbon monoxide and nitrogen unadsorbed as a lean reject gas, desorbing said methane from said adsorbent, and returning said methane as reactant to said reaction zone.

9. A process according to claim 8 in combination with the steps of maintaining said reaction zone at an average reaction temperature of between about 700° F. and about 1000° F., maintaining the pressure thereof at values between about 50 p.s.i.g. and about 500 p.s.i.g., maintaining a molar ratio of methane to nitric acid of greater than about 5.0, introducing said secondary stream of solids into said quenching zone at a temperature below about 500° F., and controlling the reaction time at values below about 5 seconds.

10. A process according to claim 8 in combination with the step of preheating said methane prior to introduction thereof into said reaction zone by passing it in direct heat exchange relation with said secondary stream of solids to produce cool solids for said quenching zone and preheated reactant methane.

11. A process according to claim 8 wherein the step of conveying said warm mixed solids from said quenching zone to said elevated solids receiving zone comprises the steps of passing the mixed solids into a solids pressuring zone, injecting a fluid to raise the pressure in the interstices of the solids therein to a value above that of said reaction and quenching zones, passing the solids into and through an elongated solids conveyance and cooling zone by flowing concurrently therethrough into said solids receiving zone a reactant fluid at a rate sufficient to overcome forces of gravity and friction acting on said solids, and applying a flow restriction against the mass of solids discharging from said conveyance zone without substantially restricting the discharge of said fluid to maintain said solids during conveyance as an upwardly moving mass having substantially the static bulk density of said solids when at rest.

12. A process according to claim 8 in combination with the steps of separately injecting a seal gas into said primary and secondary solids streams after removal from said primary and secondary cooling zones and before introduction of said solids into said reaction and quenching zones respectively.

13. An apparatus for conducting high temperature exothermic reactions at short reaction times which comprises an elevated solids receiving chamber, a subjacent primary solids cooler and a subjacent secondary solids cooler each connected at its upper extremity to the lower extremity of said chamber in solids-receiving relation thereto, a reaction chamber positioned below said primary cooler and having a downwardly opening outlet, said reaction chamber being connected at its upper end to the lower portion of said primary cooler in solids-receiving relation thereto, a quenching chamber surrounding said reaction chamber and connected at its upper end to the lower portion of said secondary cooler in solids-receiving relation thereto, a solids conveyor communicating at its inlet with the bottom of said quenching chamber and at its outlet with said elevated solids receiving chamber, a reactant inlet opening into said reaction chamber, a product outlet opening from said quenching chamber, fluid fractionator means connected in fluid-receiving relation to said product outlet and adapted to separate the desired product of said exothermic reactions from unreacted reactant and undesirable by-product fluids, and means for recirculating a recycle fluid containing unreacted reactant from said fractionator means to said reactant inlet.

14. An apparatus according to claim 13 wherein said solids conveyor comprises an upper solids surge chamber connected to said quenching chamber in solids-receiving relation thereto, a subjacent solids pressuring chamber, a valved conduit connecting the bottom of said surge chamber to the top of said pressuring chamber, an induction chamber positioned below said pressuring chamber, a valved conduit connecting the bottom of said pressuring chamber to the top of said induction chamber, an elongated conveyance conduit connecting the bottom of said induction chamber with said solids receiving chamber, means for applying a solids flow restriction against the mass of solids discharging from the outlet of said conveyance conduit to maintain the solids therein during conveyance as a dense, upwardly moving mass having substantially the solids static bulk density when at rest, a valved conduit for fluid communicating with said pressuring chamber, a conveyance fluid inlet conduit opening into said induction chamber, a conveyance fluid outlet from said solids receiving chamber, and a controller instrument means for actuating valves in said valved conduits so as to alternately fill, pressure, empty, and depressure said pressuring chamber in sequence to introduce solids from said quenching chamber into said induction chamber at a substantially higher pressure for conveyance.

15. An apparatus for conducting exothermic gas reactions at very short controlled reaction times which comprises an elevated solids receiving chamber, a subjacent primary solids cooler and a subjacent secondary solids cooler, each connected at its upper extremity to the lower extremity of said chamber in solids-receiving relation thereto, a reaction chamber positioned below said primary cooler and connected at its upper extremity to the lower portion of said primary cooler in solids-receiving relation thereto, a quenching chamber surrounding said reaction chamber and connected at its upper extremity to the lower portion of said secondary cooler in solids-receiving relation thereto, a solids conveyor communicating at its inlet with the bottom of said quenching chamber and at its outlet with said elevated solids receiving chamber, a reactant inlet opening into said reaction chamber, a product outlet opening from said quenching chamber, said reaction chamber having a lower outlet which opens downwardly into the lower portion of said quenching chamber, said reactant inlet opening into and said product outlet opening from the upper part of said reaction and quenching chambers respectively, whereby the reactant gas passes downwardly through said reaction zone concurrently with the primary stream of solids which absorbs exothermic heat of reaction to maintain more nearly isothermal conditions therein, and then passes radially outward from said lower outlet and then upwardly through said quenching chamber countercurrently to said secondary stream of solids to quench the reaction product and stop the reaction.

16. An apparatus according to claim 15 wherein said solids conveyor comprises an upper solids surge chamber connected to said quenching chamber in solids-receiving relation thereto, a subjacent solids-pressuring chamber, a valved conduit connecting the bottom of said surge chamber to the top of said pressuring chamber, an induction chamber positioned below said pressuring chamber, a valved conduit connecting the bottom of said pressuring chamber with the top of said induction chamber, a valved conduit for fluid communicating with said solids pressuring chamber, an elongated conveyance conduit connecting the bottom of said induction chamber with said solids receiving chamber, means for applying a solids flow restriction against the mass of solids discharged from the outlet of said conveyance conduit to maintain the solids therein during conveyance as a dense upwardly moving mass having substantially the solids static bulk density when at rest, a conveyance fluid inlet conduit opening into said induction chamber, a conveyance fluid outlet from said solids receiving chamber, and a controller instrument means for operating the valves in said valved conduits to alternately fill, pressure, empty, and depressure said pressuring chamber in sequence to introduce solids from said quenching chamber into said induction chamber at a substantially higher pressure for conveyance.

17. An apparatus according to claim 13 adapted for the nitration of hydrocarbons in combination with a selective adsorption column provided with a first adsorption section and a second adsorption section, means for introducing part of said recycle fluid into the bottom of said first adsorption section, a conduit for unadsorbed gas opening from the top of said first adsorption section, an inlet conduit for a gaseous mixture containing said hydrocarbon opening into the bottom of said second adsorption section, an outlet conduit for said hydrocarbon opening from said selective adsorption column at a point below the bottom of said first adsorption section and from the top of said second adsorption section and communicating with said reactant inlet to said reaction chamber, a desorption section disposed below said secondary adsorption section, an outlet conduit therefrom for desorbed gases, and a second solids conveyor for recirculating solid granular adsorbent from the bottom to the top of said selective adsorption column to maintain a downwardly moving bed therein.

18. An apparatus according to claim 13 adapted for the nitration of hydrocarbons wherein said fluid fractionator means comprises a product fluid cooler connected in fluid receiving relation to said product fluid outlet conduit, a vapor liquid separator connected in fluid receiving relation to said cooler, a condensate fractionator connected in liquid receiving relation to the lower part of said separator, an outlet conduit from said fractionator for nitrated hydrocarbon, a first adsorber connected in gas receiving relation to the top of said separator, an inlet for an absorbent opening into the top of said first absorber, an outlet for a rich absorbent opening from the bottom of said first absorber, an outlet from the top of said first absorber for unabsorbed gases including nitric oxide, means for admixing a gas containing oxygen with said unabsorbed gases, means for introducing this mixture into the bottom of a second absorber, an inlet for water at the top of said second absorber, an outlet for nitric acid opening from the bottom of said second absorber and communicating with said reactant inlet, said means for recirculating a fluid containing unreacted reactant comprising a conduit opening from the top of said acid absorber at one end and which communicates with said reactant inlet at the other.

References Cited in the file of this patent

UNITED STATES PATENTS

| | | |
|---|---|---|
| 2,312,445 | Ruthruff | Mar. 2, 1943 |
| 2,519,874 | Berg | Aug. 22, 1950 |
| 2,609,887 | Berg | Sept. 9, 1952 |
| 2,687,372 | Ray | Aug. 24, 1954 |
| 2,709,673 | Berg | May 31, 1955 |

UNITED STATES PATENT OFFICE

CERTIFICATE OF CORRECTION

Patent No. 2,894,041                                    July 7, 1959

Clyde H. O. Berg

It is hereby certified that error appears in the printed specification of the above numbered patent requiring correction and that the said Letters Patent should read as corrected below.

Column 1, line 59, for "invloves" read -- involves --; column 7, line 49, for "recactors" read -- reactors --; column 8, line 8, for "oxde" read -- oxide --; column 11, line 17, for "such a fuming" read -- such as fuming --; column 12, line 23, for "minium" read -- minimum --; column 13, line 54, for "direct heat" read -- indirect heat --.

Signed and sealed this 1st day of March 1960.

(SEAL)

Attest:

KARL H. AXLINE
Attesting Officer

ROBERT C. WATSON
Commissioner of Patents